United States Patent [19]

Sherman et al.

[11] Patent Number: 4,758,755

[45] Date of Patent: Jul. 19, 1988

[54] REMOVABLE WINDING COVER FOR UNIT BEARING MOTOR

[75] Inventors: Jeff S. Sherman, St. Louis County; Ronald D. Williams, St. Charles County, both of Mo.

[73] Assignee: Emerson Electric Co., St. Louis, Mo.

[21] Appl. No.: 28,952

[22] Filed: Mar. 24, 1987

[51] Int. Cl.⁴ ............................................... H02K 5/00
[52] U.S. Cl. ........................................ 310/89; 310/42; 310/91; 310/258
[58] Field of Search .................. 310/89, 90, 42, 91, 310/258; 336/98; 174/52 R

[56] References Cited

U.S. PATENT DOCUMENTS

| | | | |
|---|---|---|---|
| 3,420,335 | 1/1969 | Dochterman | 310/90 |
| 3,486,050 | 12/1969 | Dederick | 310/90 |
| 3,875,436 | 4/1975 | MacFarland | 310/89 |
| 4,209,722 | 6/1980 | Peachee | 310/90 |
| 4,565,937 | 1/1986 | Uhen | 310/90 |

FOREIGN PATENT DOCUMENTS

| | | | |
|---|---|---|---|
| 3220795 | 12/1983 | Fed. Rep. of Germany | 310/89 |
| 0049745 | 10/1965 | Poland | 310/89 |
| 0824882 | 12/1959 | United Kingdom | 310/258 |
| 1286462 | 8/1972 | United Kingdom | 310/258 |
| 2061775 | 11/1979 | United Kingdom | 310/89 |

Primary Examiner—R. Skudy
Attorney, Agent, or Firm—Polster, Polster and Lucchesi

[57] ABSTRACT

A unit bearing motor typically has an end shield, a stator core mounted within the end shield with the core extending axially out beyond the end shield. The core receives the windings of the motor and a winding cover is secured to the portion of the core extending out beyond the end shield so as to at least in part enclose the stator and the windings. The cover is a unitary member formed of sheet metal and has a peripheral rim at the end of the cover adjacent the end shield. The side walls of the cover have a plurality of indentations or dimples formed therein which locally engage the portion of the core extending beyond the end shield so as to securely hold the cover with respect to the core, but yet so as to permit the ready removal of the cover without damage to the cover or the windings.

3 Claims, 1 Drawing Sheet

U.S. Patent    Jul. 19, 1988    4,758,755
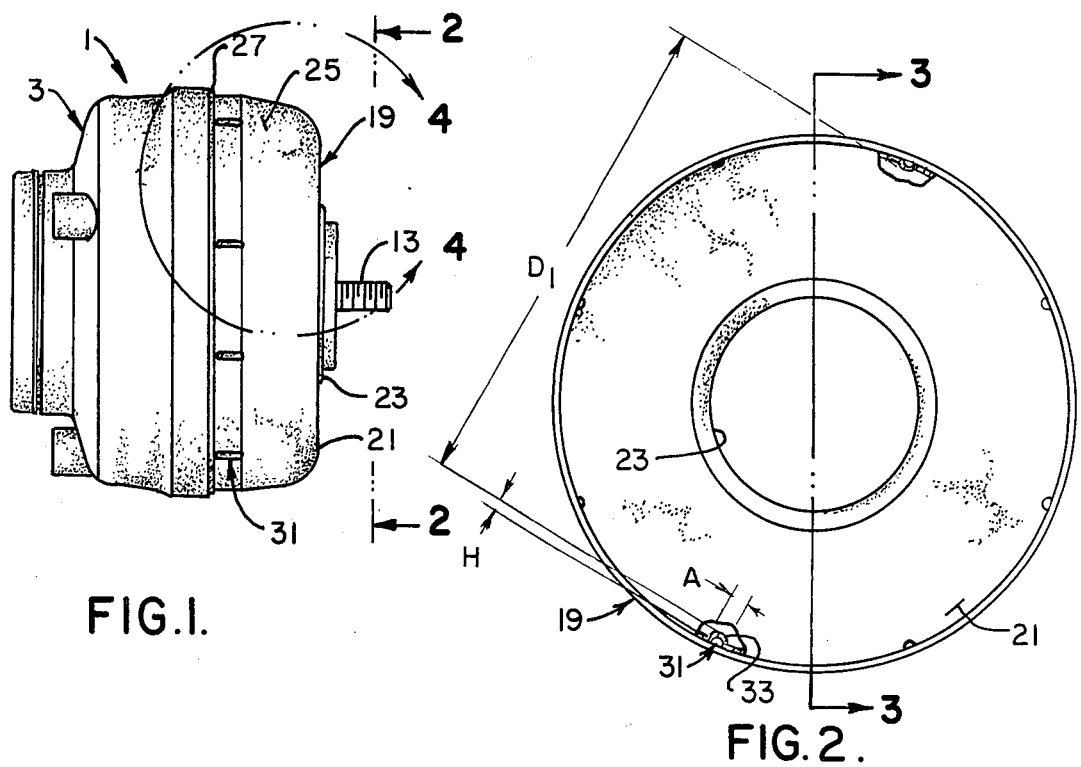
FIG.1.
FIG.2.
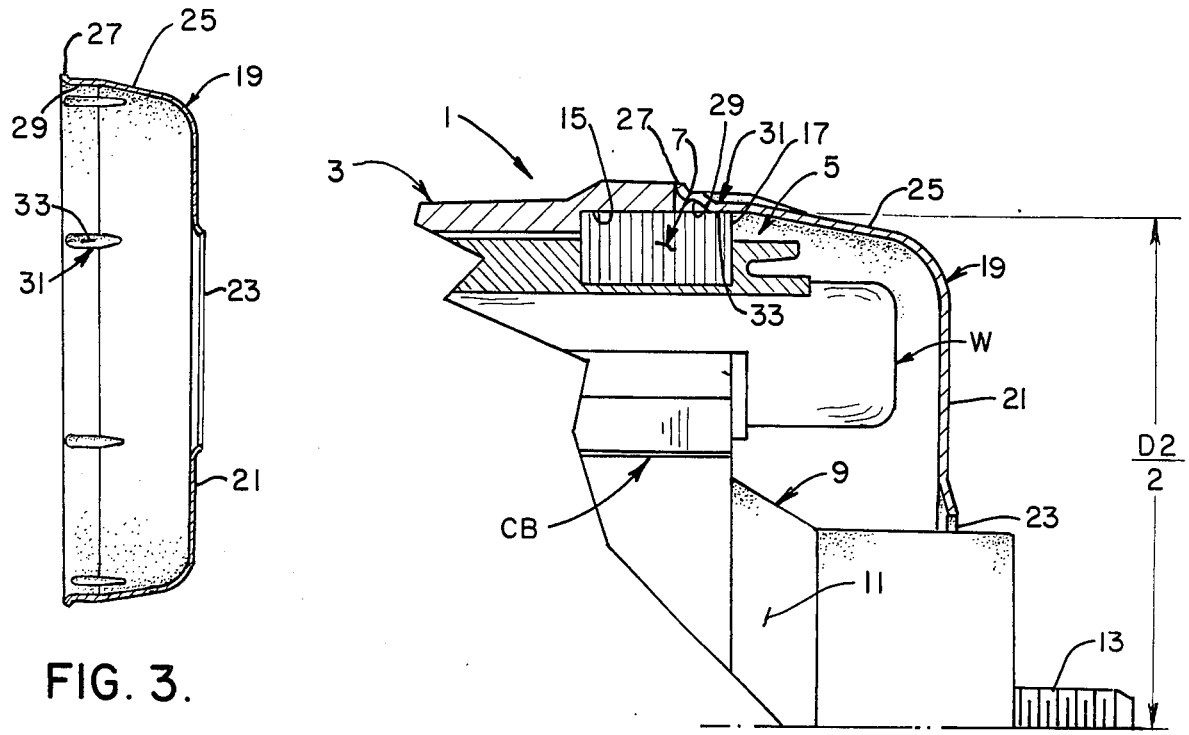
FIG. 3.
FIG.4.

REMOVABLE WINDING COVER FOR UNIT BEARING MOTOR

BACKGROUND OF THE INVENTION

This invention relates to unit bearing motors, and more particularly to a removable winding cover for such a unit bearing motor.

Reference may be made to the co-assigned U.S. Pat. No. 4,209,722, issued June 24, 1980, which discloses, in detail, the construction of a typical unit bearing motor. Such unit bearing motors are oftentimes utilized as the condenser fan motor in a home refrigerator or the like.

Typically, in a unit bearing motor, such as shown in the above-noted U.S. Pat. No. 4,209,722, a cast endshield has an integral central boss which extends at least part-way into the stator. The rotor shaft of the rotor is journaled within suitable bushings carried within this boss such that a single bearing mounts and rotatably journals the rotor within the stator. The endshield encloses and protects one side of the windings of the motor and a unitary, sheet metal cover is pressed onto an outer surface of the stator core which extends axially beyond the endshield so as to enclose and protect the other side of the windings of the motor.

In the manufacture of unit bearing motors, it is sometimes necessary to remove the winding cover from the motor so as to permit repair of certain defects uncovered during quality control testing of the assembled motors. However, with motors constructed as shown in the above-noted U.S. Pat. No. 4,209,722, the removal of the winding covers which have been pressed onto the core oftentimes damaged components within the motor or the cover, due to the tight fit between the motor cover and the outer surface of the stator core. In addition, it was not possible to remove the winding cover in the field, and thus the prior art unit bearing motors were not readily field repairable.

The inability of being able to remove a prior art winding cover from a unit bearing motor without damage to either the cover or the stator assembly has been a long-standing problem. Each year, the assignee of this invention has found it necessary to rework tens of thousands of such unit bearing motors during the assembly and quality control testing thereof. Generally, the prior art press-fit winding cover, such as shown in the above-noted U.S. Pat. No. 4,209,722, is damaged during removal, and must be thrown away after removal. In addition, a relatively high percentage of these reworked motors experience damage to their stators during disassembly due to the difficulty of removing the winding cover, and these motors with damaged stators are also scrapped.

SUMMARY OF THE INVENTION

Among the several objects and features of this invention will be noted the provision of a winding cover for a unit bearing motor which may be readily secured in place on a portion of the stator core of a unit bearing motor extending axially out beyond the endshield of the motor so as to protect the windings and the stator of the motor from damage, and yet which can be readily removed in expeditious fashion, both during manufacture of the motor for reworking purposes and in the field for repair purposes, without damage to the winding cover or to the stator assembly of the motor;

The provision of such a winding cover which is no more expensive to fabricate than prior art winding covers, and which may be installed and removed without special tooling or tools;

The provision of such a winding cover for an electric motor which firmly remains in place under all normal operating conditions of the motor; and The provision of such a unit bearing motor winding cover which is of rugged construction, which is easy to install, and which does not require any additional material or labor during manufacture.

Other objects and features of this invention will be in part apparent and in part pointed out hereinafter.

Briefly stated, a unit bearing motor has an endshield and a stator core mounted within the end shield. The core is comprised of a plurality of laminations of a suitable ferromagnetic material having a central bore therethrough. The core extends axially out beyond the endshield. A rotor assembly is rotatably mounted within the central bore of the core, and the rotor has a rotor shaft extending endwise therefrom. The endshield has a bearing for receiving and journaling the rotor shaft thereby to journal the rotor with respect to the endshield, with the rotor being substantially centered within the central bore of the core. A cover is secured to the portion of the core extending axially out beyond the endshield. The cover at least in part encloses the rotor and the stator. Specifically, the improvement of this invention relates to the cover being of unitary sheet metal construction and having a peripheral rim around the inner end thereof, with the inner face of the cover proximate the rim being engageable with the above-noted portion of the core extending axially out beyond the endshield. The cover has a plurality of spaced indentations projecting generally radially inwardly of the cover and being spaced at substantially equal angular intervals around the cover. The indentations forceably engage the outer surface of the core thereby to secure the cover with respect to the core and to permit the ready removal of the cover.

BRIEF DESCRIPTION OF THE DRAWINGS

FIG. 1 is a side elevational view of a unit bearing motor having the removable winding cover of the present invention fitted thereto;

FIG. 2 is an end elevational view of the winding cover, taken along line 2—2 of FIG. 1, on a somewhat enlarged scale with portions of the cover end and side walls broken away so as to illustrate a plurality of substantially equal angularly spaced indentations formed in the cover pide walls and engageable with the outer surfaces of the core of the unit bearing motor for securely holding the cover in place;

FIG. 3 is cross sectional view taken along line 3—3 of FIG. 2; and

FIG. 4 is a partial longitudinal cross sectional view, taken along line 4—4 of FIG. 1, on an enlarged scale, of the unit bearing motor, illustrating the manner in which the improved winding cover of the present invention is secured to the motor.

Corresponding reference characters indicate corresponding parts throughout the several views of the drawings.

DESCRIPTION OF A PREFERRED EMBODIMENT

Referring now to the drawings, a unit bearing motor, as indicated in its entirety by reference character 1, is illustrated. This unit bearing motor is essentially similar to the unit bearing motor which is disclosed in the above-noted co-assigned U.S. Pat. No. 4,209,722, issued June 24, 1980. This U.S. Pat. No. 4,209,722 is herein incorporated by reference. The salient structural features of unit bearing 1 will now be described. However, for a more detailed description of the construction of the unit bearing motor, reference may be made to the above-noted U.S. Pat. No. 4,209,722.

More specifically, unit bearing motor 1 has an endshield 3 at one end thereof which consists of a unitary, rigid casting of a suitable alloy (aluminum or the like), such that the endshield constitutes a main structural member of the motor. As shown in FIG. 4, a stator, as generally indicated at 5, is received and mounted within an open face of the endshield. The stator includes a core 7 comprised of a plurality of laminations of suitable ferromagnetic material, with the core having a central bore CB extending longitudinally therethrough. As is conventional, the core has a plurality of radial slots (not shown) which receive coils of wire inserted therein so as to constitute the windings W of the motor. Additionally, unit bearing motor 1 includes a rotor assembly, as generally indicated at 9, having a rotor body 11 of squirrel cage construction. The rotor body is rotatably mounted and is substantially centered within central bore CB of core 7. A rotor shaft 13 extends endwise from rotor body 11, and one end of the rotor shaft is received in and journaled within a unit bearing integrally provided with endshield 3. Reference may be made to the above-noted U.S. Pat. No. 4,209,722 for a more complete description of the construction of the bearing and the mounting of the rotor within endshield 3.

As indicated at 15, endshield 3 has an accurately machined shoulder around its outer end for accurately receiving and securing core 7 of stator 5 relative to the endshield in such manner that the core is securely mounted within the endshield, and in such manner that central bore CB is substantially coaxial with the bearing (not shown) carried by the endshield and journaling rotor 9. As indicated by reference character 17 in FIG. 4, an end portion of core 7 extends axially outwardly beyond the end of endshield 3.

A cup-shaped winding cover 19 is secured to the portion 17 of core 7 extending out beyond the end of endshield 3 by means of an interference fit with the outer surface of core 7 so as to protect windings W and portions of the stator 5. Preferably, winding cover 19 is constituted by a unitary stamping of suitable sheet metal (mild steel) or the like. Winding cover 19 has a cover base wall 21 having a central opening 23, therein for receiving at least a portion of rotor body 11. Cover side walls 25 extend forwardly from cover base wall 21 in generally axial direction so as to be disposed on the outside of core portion 17 extending axially beyond the end of endshield 3. A radially outwardly extending rim 27 extends circumferentially around the open, inner end of winding cover 19 proximate the core. The inner surface 29 of winding cover side walls 25 cooperates with the outer surfaces of core 7 extending axially beyond endshield 3 for securement of winding cover 19 on the core.

In accordance with the present invention, a plurality of substantially equally angularly spaced, radially inwardly, protruding dimples or indentations 31 are provided on the outermost portion of side walls 25 of winding cover 19 for selected local interference engagement with the outer surface of core end portion 17 thereby to securely mount winding cover 19 on the core 7, and yet permitting the removal of the winding cover without damage to either the winding cover or to stator 5. More specifically, cover 19 is shown to have eight dimples or indentations 31 formed in the outer portions of side walls 25, with the dimples or indentations extending in longitudinal or axial direction relative to the centerline of motor 1 such that contact between the cover 19 and core 7 is limited to eight lines of contact as the cover is forced onto the core. Dimples 31 extend radially inwardly from the inner face of cover 19 a distance H and have a width A so as to ensure line contact with the core.

As shown best in FIG. 2, the inner surface 33 of indentations or dimples 31 project inwardly relative to the inner surface 29 of cover side walls 25 a predetermined distance such that the diametric spacing D1 between diametrically opposed dimples 31 is somewhat less than the outer diameter D2 (see FIG. 4) of core end portion 17 such that the cover must be resiliently deformed so as to fit on core end portion 17. Preferably the ratio of the inside diameter D1 between the inside surface 33 of dimples 31 relative to the outside diameter D2 of core end portion 17 ranges between about 0.95 and 0.99. Even more preferably, the ratio of the diameters D1/D2 is about 0.98. This allows the cover to have sufficient resiliency so as to positively grip the outer face of core 7 so as to securely hold cover 19 in place, but yet permits removal of the cover by inserting a screwdriver or the like between rim 27 and the end of endshield 3.

For example, cover 19 may be formed of 22-gauge steel and has eight dimples 31. This cover has a diameter D1 between dimples 31 ranging between 3.245 and 3.255 inches. It has been found that a cover so formed and forceably fitted onto the end portion 17 of core 7 having an outer diameter D2 ranging between 3.300 and 3.302 inches will withstand a 10-pound tension force applied to the center of the cover so as to resist removal when only two dimples 31 of the cover engage end portion 17 of core 7 about 0.188 inches in length.

It has also been found that cover 19 may be readily removed by inserting the assembled motor 1 into a suitable induction heater device which almost instantaneously heats up cover 19 to a temperature sufficient to loosen it relative to core 7. However, in the event such induction heating device is not available, cover 19 may be readily removed by inserting a screwdriver between rim 27 of the cover and the end of the endshield, and prying the cover from the core.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. In a unit bearing motor having an end shield, a stator core mounted within said end shield, said core being comprised of a plurality of laminations having a central bore therethrough, a portion of said core extending axially out beyond said end shield, a rotor rotatable within said central bore of said core, said rotor having a rotor shaft, said end shield receiving and journaling said rotor shaft thereby to journal said rotor with respect to said end shield with said rotor being substantially centered within said central bore, and a cover secured to said core portion extending out beyond said end shield, said cover at least in part enclosing said rotor and said stator, wherein the improvement comprises: said cover being of unitary sheet metal construction and having an inner end proximate said core, said cover having a peripheral rim around the inner end thereof, said cover having an inner face, the inner face of said cover proximate said rim having a plurality of indentations spaced at substantially equal angular intervals from one another around said cover, said indentations being forceably engageable with said core portion extending axially beyond said end shield thereby to secure said cover to said core and to permit the removal of said cover from said core.

2. In a unit bearing motor as set forth in claim 1 wherein said indentations within said cover has a diameter D1, and wherein said core portion extending axially beyond said end shield has a diameter D2, with the ratio of D1/D2 ranges between about 0.95 and 0.99 thereby to ensure that said indentations securely engage said core and yet permit removal of said cover from said core without damage.

3. In a unit bearing motor as set forth in claim 2 wherein said ratio is about 0.98.

* * * * *